CATHARINE JUDSON.

CORSET SPRING.

No. 7,034. Reissued April 4, 1876.

WITNESSES

B. M. Williams

J. H. Gately.

INVENTOR

Catherine Judson

By her Attys.

Henry Williams & Co

N. PETERS, PHOTO-LITHOGRAPHER, WASHINGTON, D. C.

UNITED STATES PATENT OFFICE.

CATHARINE JUDSON, OF BOSTON, MASSACHUSETTS.

IMPROVEMENT IN CORSET-SPRINGS.

Specification forming part of Letters Patent No. 173,124, dated February 8, 1876; reissue No. 7,034, dated April 4, 1876; application filed March 27, 1876.

*To all whom it may concern:*

Be it known that I, CATHARINE JUDSON, of Boston, in the county of Suffolk and State of Massachusetts, have invented a new and valuable Improvement in Corsets; and I do hereby declare that the following is a full, clear, and exact description thereof, reference being had to the accompanying drawing, and to the letters of reference marked thereon.

My invention relates particularly to that portion of a corset known as the clasp or spring, and is intended to prevent the breaking of the clasp or busk at that portion where breakage is most likely to occur—viz., at the part near the natural waist—by means mainly of an additional short supporting-steel, fixed immovably upon the wide steel or busk at two points, one above and the other below the waist or center of the busk, and having its ends free.

I am aware that inventions have been patented which include additional strengthening-steels, unfastened or fastened at the center to the main steel.

The advantage which my steel, fastened at the two points above named, has over steels unfastened or fastened at their centers to the busk is that, between the points of fastening, the steels, being kept stiff by the fastenings, help to support each other, while, if they were fastened merely at the center, the additional strength would only be the strength of an unaided steel, even then weakened by the fastening process.

In order to still further strengthen the clasp the studs are placed near that edge of the busk which is farther from the hooking or fastening steel. This is the reverse of the usual position, and it brings the fastening-steel, when clasped, directly over the strengthening-steel and over the center of the busk. Thus the three steels are piled upon each other and their strength combined, instead of being side by side, as ordinarily the case.

Figure 1:
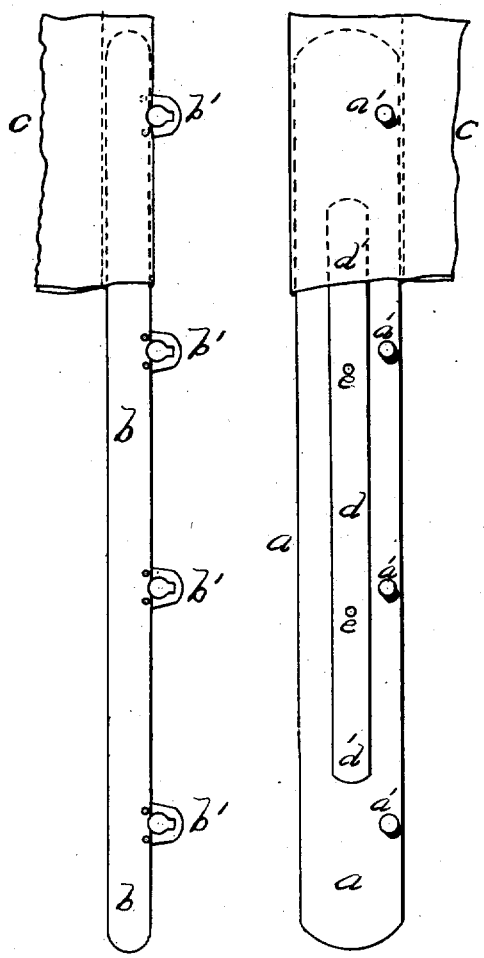
Figure 2:
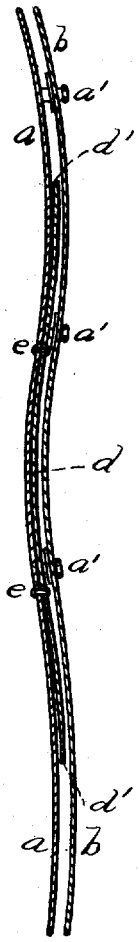

In the accompanying illustration, Figure 1 is a view of a corset-clasp embodying my invention. The clasp is represented as unfastened, and a portion of the cloth of the corset is attached to the upper part of the clasp. Fig. 2 is a longitudinal section of the clasp when fastened, showing the busk, strengthening-steel, and fastening-steel in a pile.

Similar letters of reference indicate corresponding parts.

*a* is the wide steel or busk, provided with studs *a'*. These studs are placed upon the left side (as it is worn) of the busk, that being the farther side from the fastening-steel *b*, which is provided with hooks *b'*. The steels *a* and *b* form the clasp, and rest in pockets in the corset *c*, in the positions shown in the drawing. Attached to the wide steel *a* by means of rivets or similar fastening devices *e* is a strengthening-steel, *d*. This steel *d* does not extend for the entire length of the steels *a b*, but is a short steel, placed where it is most needed—*i. e.*, near the center of the clasp-steels at the natural waist, where the steels are bent and strained the most. This steel is not provided with any clasping devices, but is solely a strengthener, made as economically and as small as possible. The ends *d'* are left free, while from *e* to *e* the steel is stiff and immovable. It lies in the same pocket as the steel *a*.

It will thus be seen that the clasp is strengthened, first, by the steel *d*, fixed at points each side the waist or center, small, taking little room, and placed where it will do the most good; and, second, by the arrangement of the three steels *a*, *d*, and *b* in a pile, as seen in Fig. 2, so that their strength is combined when clasped.

Having thus fully described my invention, what I claim, and desire to secure by Letters Patent, is—

1. In a corset clasp or spring, the combination, with the busk *a*, of the short strengthening-steel *d*, said steel *d* being fastened or fixed to the said busk upon each side of the waist portion or the center of the busk, and having its ends free, as and for the purpose herein specified.

2. In a corset-clasp, the herein-described steels *a d b* and studs *a'*, arranged so that, when clasped, the steel or spring *b* lies centrically over and upon the steels *d* and *a*, thus constituting a pile of three springs, as and for the purpose herein set forth.

CATHARINE JUDSON.

Witnesses:

HENRY W. WILLIAMS,

R. A. GEORGE.